Dec. 13, 1932.    L. ZUBER    1,890,713

SHOCK ABSORBER

Filed May 21, 1931

Inventor:
Ludwig Zuber

Patented Dec. 13, 1932

1,890,713

UNITED STATES PATENT OFFICE

LUDWIG ZUBER, OF MANNHEIM-FEUDENHEIM, GERMANY

SHOCK ABSORBER

Application filed May 21, 1931, Serial No. 538,980, and in Germany May 19, 1930.

This invention relates to a shock absorber for motor vehicles of the kind operating through the medium of a liquid.

According to the invention the shock absorber is so constructed that the generation of pressure in the two working chambers during the braking period and the passage of liquid into and out of the working chambers on the bending of the springs can be controlled by a single check valve arranged in the cover of the shock absorber and provided with an adjustable seat.

A further novelty of the invention consists in providing two annular liquid supply channels in the cover concentric with the shaft.

Figure 1:
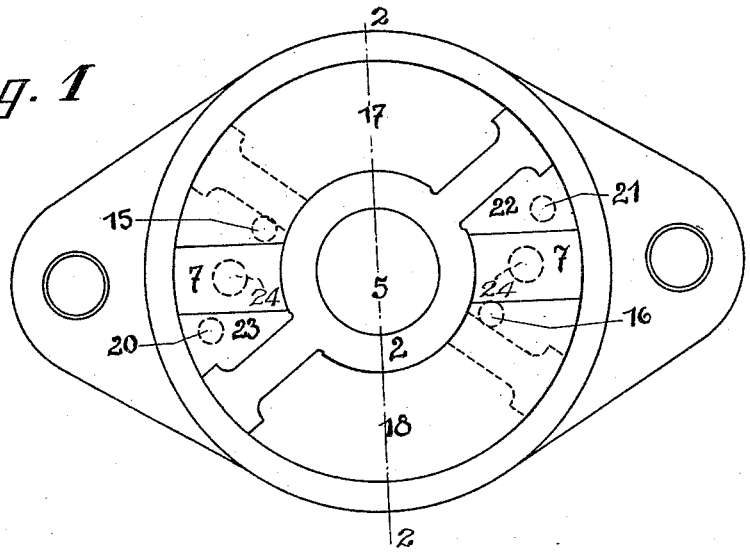
Figure 2:
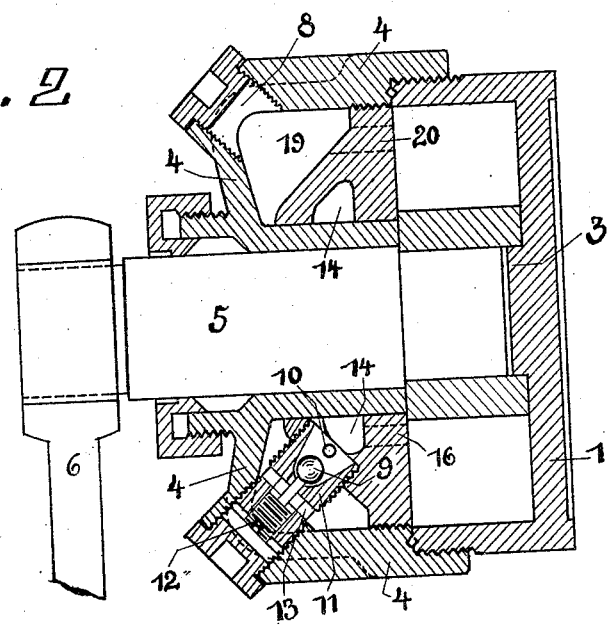

Fig. 1 of the accompanying drawing represents a view of the shock absorber with removed cover, the elements being shown in the position they occupy before the commencement of the brake period, and Fig. 2 is a vertical section on the line 2—2 of Fig. 1.

The casing 1 contains a rotatable, valveless, double piston 2 which is supported in the cover 4 and on a pivot 3. The shaft 5 carries a lever 6 which acts in known manner by means of a linkage on the double piston 2. To obtain double pressure effect, the casing is provided with two rigid radial walls 7 having locking means 24. The cover 4 is provided with a filling aperture 8 and carries a check valve 9 the stroke of which is limited by a stop 10. Through the medium of a screw 12 the braking effect can be regulated. The adjustable valve seat 11 is provided with openings 13 through which liquid can flow from and to the valve. The effective size of the openings 13 can be varied by an adjustment of the valve seat 11 so that the openings will be more or less covered by the surrounding part of the support. Thus a breaking effect can be produced also on the bending of the springs, this being of importance in connection with some kind of motor vehicles. The adjustment of the valve 9 is not effected by the adjustment of the openings 13. The cover 4 is also provided with an inset having an annular channel 14 arranged about the shaft and the inset has openings 15 and 16 through which liquid can pass to and from the working chambers 17 and 18. There is also a channel 19 fitted with openings 20 and 21 for passing liquid from the chambers 22 and 23 to the working chambers 17 and 18.

In response to a shock, the chassis springs bend freely or suitably braked and turn, through the medium of the linkage, the vaned double piston 2 to the right from the position shown dotted in Fig. 1. Owing to the vacuum produced and to the acceleration of the liquid, which passes from the chambers 22, 23 through the openings 20, 21 in the channel 19 and through the openings 13 to the valve, the latter moves into its topmost position. The liquid then fills the working chambers 17 and 18 through the channel 14 and through the openings 15 and 16.

On the return of the springs, the double piston 2 turns in the opposite direction. The valve then moves into its lowermost position against the stop 12, and the flow of liquid is impeded to an extent dependent on the adjustment of said stop. In this manner a pressure is produced in the working chambers 17 and 18 which counteracts the shock.

The arrangement has the advantage that the flow of liquid through the annular channels and through openings in the cover is effected through the shortest possible route and in the simplest manner. Moreover, both the bending and the return of the springs can be braked.

I claim:

1. A shock absorber for motor vehicles of the character described, comprising a casing having rigid radial walls, a valveless, double piston arranged between said walls, a cover for the casing having annular channels and openings in said channels, and a check valve on the cover for regulating the flow of liquid through said channels and openings to and from the working spaces of said piston.

2. A structure as claimed in claim 1 wherein the seat for the check valve is provided with adjustable openings.

LUDWIG ZUBER.